Figure 1:
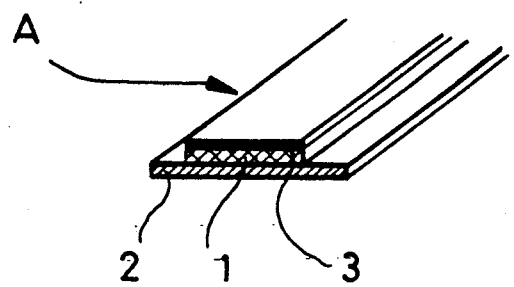

United States Patent [19]
Langen et al.

[11] Patent Number: 4,997,689
[45] Date of Patent: Mar. 5, 1991

[54] METHOD AND ASSEMBLY FOR SEALING MULTIPLE-STRAND CABLE BUNDLES IN A LONGITUDINALLY WATERTIGHT MANNER

[75] Inventors: Dieter Langen, Bonn; Helmut Arenz, Alfter-Impekoven, both of Fed. Rep. of Germany

[73] Assignee: DSG Schrumpfschlauch GmbH, Fed. Rep. of Germany

[21] Appl. No.: 315,419

[22] Filed: Feb. 23, 1989

[30] Foreign Application Priority Data

Mar. 18, 1988 [DE] Fed. Rep. of Germany ....... 3809167

[51] Int. Cl.⁵ .................. B32B 1/08; H01B 13/06
[52] U.S. Cl. .................. 428/34.9; 156/52; 156/83; 156/86; 174/DIG. 8; 174/77 R; 206/568; 428/35.1; 428/314.4; 428/349
[58] Field of Search .......... 174/DIG. 8, 77 R; 156/52, 83, 86; 428/34.9, 35.1, 913, 314.4, 349; 206/568

[56] References Cited

U.S. PATENT DOCUMENTS 4,241,234 12/1980 Haeder .......... 174/DIG. 8
4,409,426 10/1983 Nolf et al. ....... 174/DIG. 8
4,518,448 5/1985 Henry et al. ........... 156/86
4,647,716 3/1987 Akiyama et al. ........... 156/86
4,881,995 11/1989 Arenz ............... 428/34.9

Primary Examiner—James Seidleck
Attorney, Agent, or Firm—Scully, Scott, Murphy & Presser

[57] ABSTRACT

A method is disclosed for forming longitudinally watertight sealed portions in a cable bundle comprising a plurality of cable strands which employs a composite adhesive strip having at least two layers, a first layer consisting of a mass having good adhesive properties at ambient temperature, and a second layer consisting of a melt adhesive. At the location of the portion to be sealed, the layer of the composite adhesive strip having good adhesive properties at ambient temperature is adhesively secured to the spread-out cable strands of the cable bundle to be sealed. After winding the cable strand layer provided with the composite adhesive strip upon itself or folding it together, an outer heat-shrinkable material (hose or sheet material) is applied about the portion to be sealed. A heat treatment is applied for causing the outer shrinkable material to shrink and the melt adhesive to swell between the cable strands themselves and between the cable strands and the outer heat-shrinkable material are filled with a plastic material.

19 Claims, 2 Drawing Sheets

METHOD AND ASSEMBLY FOR SEALING MULTIPLE-STRAND CABLE BUNDLES IN A LONGITUDINALLY WATERTIGHT MANNER

The invention relates to a method for sealing a cable bundle comprising a plurality of cable strands in a longitudinally watertight manner by filling the voids existing between the individual cable strands with a plastic mass at a predetermined location to be sealed, wherein a plastic element capable of swelling to an enlarged cross-sectional shape in response to being heated and containing, or consisting of, a thermoplastic melt adhesive, is embedded between said cable strands of said cable bundle, and a radially prestretched heat-shrinkable hose member is mounted on the outer periphery of the cable bundle at said location to be sealed, whereupon said cable bundle location to be sealed is subjected to a heat treatment for causing said embedded plastic element to swell and said thermoplastic melt adhesive to be activated, and for shrinking said shrinkable hose member tightly about said cable bundle, in accordance with U.S. Pat. No. 4,881,995.

The invention also relates to an assembly kit for making an assembly for sealing a cable bundle comprising a plurality of cable strands in a longitudinally watertight manner, comprising a heat-shrinkable hose member adapted to shrink back to a reduced diameter in response to being heated, and a plastic element of a material capable of swelling up to an enlarged cross-section in response to being heated, containing, or consisting of, a thermoplastic melt adhesive, said heat-shrinkable hose member and said plastic element defining a space for the accommodation of said cable strands therebetween, in accordance with U.S. Pat. No. 4,881,995.

When applying the method defined above to the processing of cable bundles comprising a great number of cable strands, the plastic element placed between the cable strands of the cable bundle has its outer periphery formed with a plurality of grooves or receiving pockets. The lands separating these grooves or pockets from one another prevent the cable bundles from being too densely packed, so that the molten melt adhesive would be unable to flow into the voids between the cable strands. The plastic element employed in the method defined above is frequently also in the form of an open ring, permitting a first plurality of cable strands to be threaded through this open ring, while a second plurality of cable strands can be disposed about the outer periphery of the open ring, which may to this purpose be provided with grooves or pockets as described above.

The above discussed method according to U.S. Pat. No. 4,881,995 requires an excessive amount of manual labour and does not always ensure that the cable strands are subjected to the heat treatment in the desired correct arrangement.

As stated in the above quoted U.S. Pat. No. 4,881,995 the technical progress achieved by the application of this method results from the fact that the voids existing between the individual cable strands and between the cable strands and the surrounding heat-shrinkable hose member are filled with a plastic material at a predetermined sealing location, this plastic material being provided by the plastic element placed between the cable strands. The inner surface of the surrounding heat-shrinkable hose member may also be provided with a melt adhesive layer, in which case the void-filling plastic material is in part provided by this last-named melt adhesive layer. After the plastic element has been placed between the cable strands and a radially heat-shrinkable hose member has been mounted on the outer periphery of the cable bundle, the location of the cable bundle to be sealed is subjected to a heat treatment. This heat treatment results in melting and swelling of the plastic element, accompanied by the activation of the thermoplastic melt adhesive, and in the re-shrinking of the heat-shrinkable hose member tightly about the cable bundle.

The oppositely directed movements of the swelling plastic element comprising the thermoplastic melt adhesive and of the radially shrinking hose member are effective to create an increasing pressure within the cable bundle, as a result of which the melt adhesive flows into the voids between the individual cable strands to thereby achieve the desired longitudinally watertight sealing effect.

Locally defined longitudinally watertight sealing portions of cable bundles containing a pluraility of cable strands are of particular importance for instance in the motor vehicle industry. It is thus for instance desirable to provide wire harnesses with determined longitudinally watertight portions, for instance when a plug connection system is to be secured to the wire harness, or when a wire harness is to be passed through a partition, for example from the engine compartment of a motor vehicle to the passenger compartment thereof. It is also frequently required to seal a wire harness in a gas-tight manner as it is passed through a partition or the like.

It is an object of the present invention to simplify the application of a method of the type defined above in such a manner that even unskilled persons are enabled to reliably form longitudinally watertight sealing portions in cable bundles or wire harnesses of the type under discussion.

According to the invention, in a method of the type defined in the introduction, this object is attained by the provision that the plastic element is employed in the form of an elongate composite adhesive strip composed of a first layer of a kneadable mass having good adhesive properties at ambient temperatures, and a second layer consisting of the melt adhesive, and that the cable strands of the cable bundle are correctly positioned for further processing by adhesively securing them side by side to the first layer prior to the heat treatment being carried out. The method according to the invention permits the following advantages to be obtained:

It is possible to employ only a single composite adhesive strip for sealing cable bundles composed of any number of cable strands, a composite adhesive strip of a suitable length being cut from a supply reel.

The amount of plastic material required for filling all voids within the cable bundle may be adapted to any given case employed by varying the thickness and width of the melt adhesive layer of the composite strip.

The dual-layer adhesive composition of the composite strip ensures a rapid heat penetration and thus an optimum processing speed for the formation of the longitudinally watertight sealing portions.

The cable strands are securely fixed in position for the subsequent processing steps by adhesively securing them to the first layer of the composite strip due to the good adhesive properties thereof at ambient temperature.

The thus fixedly secured cable bundles with their pre-assembled sealing portions can be readily handled preparatory to further processing without the desired arrangement of the cable strands within the cable bundle being altered thereby.

The method according to the invention can be reliably performed by semiskilled workmen.

In the case of an assembly kit according to U.S. Pat. No. 4,881,995, the stated object of the invention is attained by the provision that the plastic element is formed as a composite adhesive strip comprising a first layer of a kneadable mass having good adhesive properties at ambient temperature, and a second layer made of the melt adhesive.

A composite adhesive strip may have its width and thickness suitably adapted to any given use conditions to thereby facilitate the formation of longitudinally watertight sealing portions to a considerable degree, as will be recognized from the above explanation of the advantages to be obtained by the method according to the invention.

Preferred embodiments and modifications of the invention are set forth in the sub-claims.

Figure 2:
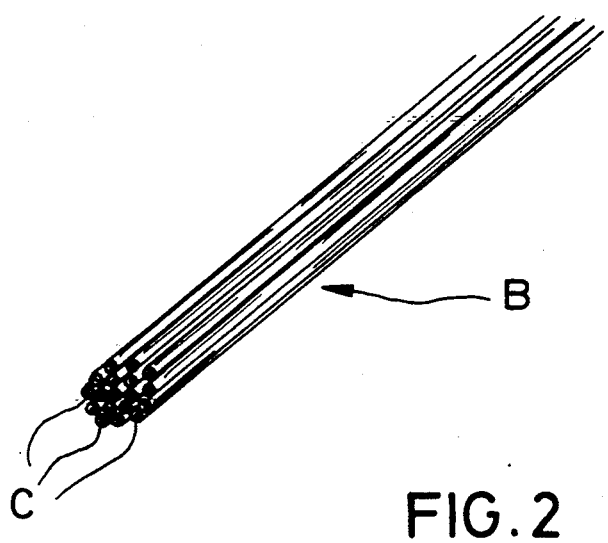
Figure 3:
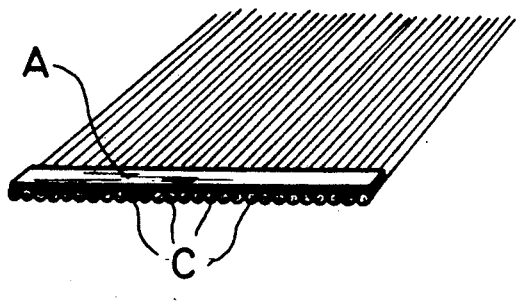
Figure 4:
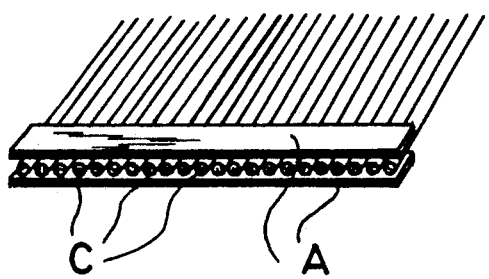
Figure 5A:
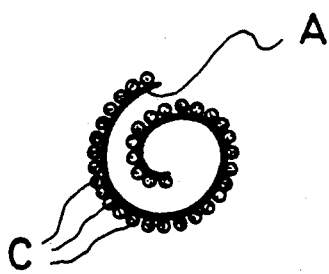
Figure 5B:
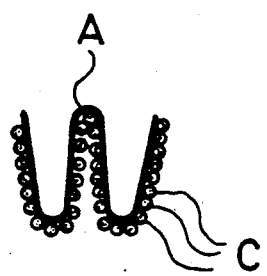
Figure 6:
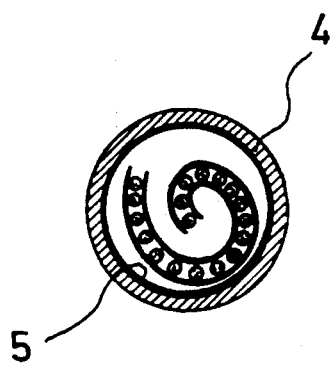
Figure 7:
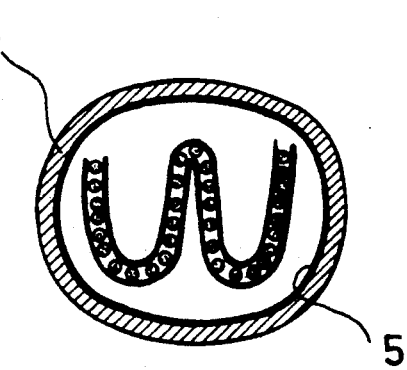
Figure 8:
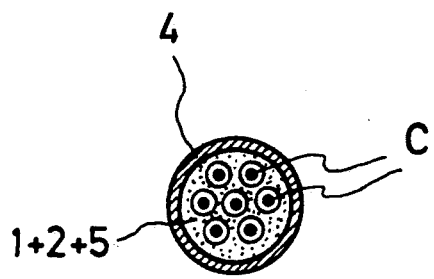

Embodiments of the invention shall now be described in detail by way of example with reference to the accompanying drawings, wherein:

FIG. 1 shows a diagrammatic illustration of a composite adhesive strip,

FIG. 2 shows a diagrammatic illustration of a cable bundle comprising a plurality of cable strands, FIG. 3 shows a specific step in the performance of the method according to the invention, FIG. 4 shows a second embodiment of the method performance step illustrated in FIG. 3, FIG. 5a shows a diagrammatic illustration for the explanation of a processing step following the processing step illustrated in FIG. 3, FIG. 5b shows a diagrammatic illustration of a processing step which may be performed as an alternative to the processing step illustrated in FIG. 5a, FIG. 6 shows a diagrammatic illustration of a processing step following the processing step illustrated in FIG. 5a and preceding the finishing heat treatment, FIG. 7 shows an illustration of a processing step which may be performed as an alternative to the step illustrated in FIG. 6 (in the case of performance of the processing step shown in FIG. 5b), and FIG. 8 shows a diagrammatic cross-sectional view of a multiple-strand cable bundle sealed in a longitudinally watertight manner by the method according to the invention.

FIG. 1 illustrates the composition of a composite adhesive strip A. In the embodiment shown, composite adhesive strip A is of a three-layered composition consisting of a first layer 1 of a kneadable mass having good adhesive properties at ambient temperature, a second layer 2 formed of a melt adhesive, and a release paper layer 3.

Materials having good adhesive properties at ambient temperatures in combination with being kneadable include chemically or physically cross-linked or non-linked elastomers with a saturated or unsaturated principal chain and polarized or non-polarized structure capable of being bonded to conventional substrates such as metals, ceramics, paper, textile materials, plastics and the like at ambient temperatures and of being plastically deformed.

Within the scope of the invention the first layer may be made of, or include, rubber materials such as rubbers made of polybutadiene homopolymers or copolymers, halogenized derivatives thereof, polyurethanes, and acrylate rubbers.

Preferentially suitable elastomers within the scope of the invention include those of the IIR type (butyl rubber) and CIIR/BIIR (halobutyl rubbers).

Also suitable are mixtures of rubber materials of saturated and unsaturated structure.

The first layer preferably consists of butyl rubber.

Suitable melt adhesive materials for the second layer are characterized in that their viscosity is altered in response to the application of heat and/or pressure, resulting in flowability of the material (as by melting).

Particularly suitable for this purpose are thermoplastic materials such as polyolefine homopolymers and polyolefine copolymers.

The following classes of substances may be named by way of example:
Polyolefines (e.g. LPDE)
Poly(ethylene-co-propylene)
Poly(ethylene-co-vinyl acetate)
Poly(ethylene-co-ethyl acrylate).

Mixtures of the above named substances have also been found to be very suitable.

Polyamides based on dimeric aliphatic acids which are subsequently polycondensed may also be taken as excellent melt adhesive systems within the scope of the invention.

"Polymer blends" of polyamides and polyamides with polyolefine copolymers are particularly well suitable materials for employ as melt adhesives according to the invention.

The above mentioned melt adhesive systems may additionally be modified in such a manner that the application of heat causes the material to foam so as to result in a porous structure. This may be brought about by the employ of volatile low-molecular compositions incorporated within the substances or on the surface thereof during the manufacturing and/or processing process. It is further possible to achieve a foaming action by the suitable metered addition of a selected foaming agent. Foaming agents of this type are adapted in response to being heated (e.g. during the shrinking process) to release a gas resulting in the formation of a foam structure generally of the closed-cell type. Examples for suitable foaming agents are azo compounds such as azo-dicarbonamide. Also useful are other foaming agents capable of the formation of foam by disintegrating at about 140° C.

The crystallite melting point of the thermoplastic melt adhesive lies in the temperature range between 60° and 120° C. Preferred foaming agents capable in response to being heated to form a closed-cell foam structure are endothermic foaming agents capable of self-nucleating decomposition and foam formation at about 140° C. An example of a foaming agent of this type is a foaming agent sold by the firm of Boehringer-Ingelheim under the designation "Hydrocerol".

The release paper layer 3 is preferably made of silicone paper. As shown in FIG. 1, the first layer I, i.e. the layer formed of a kneadable mass having good adhesive properties at ambient temperature, is disposed between melt adhesive layer 2 an release paper layer 3.

The composite adhesive strip A may be employed in the form of a supply wound onto a reel, permitting the user to unwind and cut sections of the required lengths from the supply reel.

Diagrammatically shown in FIG. 2 is a cable bundle B consisting of a plurality of cable strands C. In performing the method according to the invention, cable bundle B is spread out to result in a layer of cable strands C extending side by side at the location to be sealed. FIG. 3 shows the cable strands C of the cable bundle extending parallel to one another. At the location of the portion to be sealed, at least one of the two surfaces of the spread-out layer of cable strands C is adhesively secured to first layer 1 of composite adhesive strip A. In the state shown in FIG. 3, only one surface of the spread-out cable strand layer is adhesively secured to the composite adhesive strip. It is understood, however, that the other surface may also be adhesively secured to a composite adhesive strip A. This second embodiment is diagrammatically illustrated in FIG. 4, showing the spread-out cable strands C to be disposed between an upper composite adhesive strip portion and a lower composite adhesive strip portion.

The cable strands C adhesively secured to composite adhesive strip A as shown in FIGS. 3 and 4 may then be further processed according to one of two alternative procedures. As shown in FIG. 5, the cable strand layer adhesively secured to composite adhesive strip A is spirally wound upon itself prior to a heat-shrinkable hose member is slipped onto the portion of the cable bundle to be sealed. In this context it has been found advantageous to spirally wind the adhesively bonded cable strand layer upon itself in such a manner that the composite adhesive strip is disposed at the inside, while the cable strands extend along the exterior as shown in FIG. 5a. According to the embodiment illustrated in FIG. 5b, the cable strand layer bonded to composite adhesive strip A is pushed together in a zig-zag configuration before the heat-shrinkable hose member is slipped onto the portion of the cable bundle to be sealed.

Cable strand layers bonded to composite adhesive strips A on both sides as shown in FIG. 4 may selectively be further procesed by one of the two alternative procedures shown in FIGS. 5a and 5b. When cable strand layers provided with composite adhesive strips on both sides are spirally wound upon themselves, the winding operation may be carried out in any direction, since both surfaces of the spread-out layer are similarly provided with the composite adhesive strip.

As diagrammatically depicted in FIG. 6, a heat-shrinkable hose member 4 is slipped onto the spirally wound portion to be sealed. FIG. 7 shows the manner in which an outer heat-shrinkable hose member 4 has been slipped onto the sealing portion whereat the bonded cable strand layer has been pushed together to a zig-zag configuration. Both in FIG. 6 and in FIG. 7 the outer heat-shrinkable hose member 4 is provided with an interior melt adhesive layer 5. The material of this melt adhesive layer 5 is preferably the same as that of the second layer (melt adhesive layer) of composite adhesive strip A.

It is to be noted that it is by no means indispensable to employ respective heat-shrinkable hose members to envelope the portion to be sealed therein as shown in FIGS. 5a and 5b. The heat-shrinkable hose material could also be replaced by a heat-shrinkable sheet material which would be wound about the portion to be sealed and welded together in a tubular configuration. The processing of shrinkable sheet material in place of shrinkable hose material has been described in detail in Applicant's German Patent Application P No. 38 03 318.6-16, which is incorporated herein by reference.

The finishing heat treatment causes the outer heat-shrinkable hose member, or the outer shrinkable sheet material, respectively to shrink, and the melt adhesive layer 2 of composite adhesive strip A to melt. This heat treatment also causes melting of the material of the first layer of composite adhesive strip A. It has been found that the mixture of the melt adhesive material and the material of the first alyer (preferably a rubber material) results in a particularly effective and durable seal, so that liquids as well as gases are prevented from penetrating to the interior of the thus sealed cable bundle portion.

After the heat treatment, the sealed portion has the cross-sectional appearance shown in FIG. 8. This figure shows an outer layer 4 of a heat-shrunk plastic material surrounding cable strands C. The voids between the cable strands C and between the cable strands and outer layer 4 are completely filled with a mass which has been formed by melting and/or expansion of layers 1 and 2 of composite adhesive strip A. This filler mass may also contain material from the interior melt adhesive coating 5 of the outer heat-shrinkable material 4.

As already mentioned, the first layer of the composite adhesive strip preferably consists of a rubber material, a particularly preferred material being butyl rubber. The second layer of composite adhesive strip A consists of a melt adhesive material, preferably of a material of this type capable, in response to being heated, of foaming to thereby form a closed-cell structure.

A preferred composite adhesive strip has the following composition:

The first layer has a thickness of 0.2 to 1.5 mm, and a width of preferably 5 to 15 mm. The material of the first layer has strongly adhesive properties at ambient temperatures and other physical properties substantially corresponding to those of butyl rubber.

The melt adhesive layer 2 preferably has a thickness of about 0.2 to 1.5 mm, and a width of preferably 5 to 20 mm. The physical and other properties of this melt adhesive have already been discussed above. In addition, reference is made to U.S. Pat. No. 4,881,995.

The release paper layer 3 preferably consists of a silicone paper. This release paper is removed before use. It should project beyond the first layer by at least 1 mm on both sides. In this manner the release paper can be readily removed during the processing operation.

The function of an elastomer layer (e.g. butyl rubber) and essential advantages resulting from its employment as a first layer in combination with a melt adhesive layer as a second layer include:
more rapid and more accurate positioning of the individual strands of the cable bundle by pressing them into the rubber layer (cf. FIGS. 3 to 8);
accurate dosage of the melt adhesive as determined by the thickness, width and length of the composite adhesive strip;
excellent sealing efficiency due to the fact that each strand is enclosed in the melt adhesive and/or the sealing rubber mass (cf. FIGS. 5 to 8);
uncomplicated and flexible employment by the user, and
additional improvement of the physical properties of the seal by the employment of for instance the butyl rubber layer:
improved flexibility,
improvement of the electrical values and improved heat conduction properties for the shrinking and melting process.

What is claimed is:

1. A method for sealing a cable bundle comprising a plurality of cable strands in a longitudinally watertight manner by filling the voids existing between the individual cable strands with a plastic mass at a predetermined location to be sealed, wherein a plastic element capable of swelling to an enlarged cross-sectional shape in response to being heated and containing a thermoplastic melt adhesive, is embedded between said cable strands of said cable bundle, and a radially pre-stretched heat-skrinkable hose member is mounted on the outer periphery of the cable bundle at said location to be sealed, whereupon said cable bundle location to be sealed is subjected to a heat treatment for causing said embedded plastic element to swell and said thermoplastic melt adhesive to be activated, and for re-shrinking said shrinkable hose member tightly about said cable bundle, said plastic element being employed in the form of an elongate composite adhesive strip composed of a first layer of a kneadable mass having good adhesive properties at ambient temperatures, and a second layer containing said melt adhesive, and said cable strands of said cable bundle are correctly positioned for further processing by adhesively securing them side by side to said first layer prior to said heat treatment being carried out.

2. A method for sealing a cable bundle comprising a plurality of cable strands in a longitudinally watertight manner by filling the voids existing between the individual cable strands with a plastic mass at a predetermined location to be sealed, wherein a plastic element capable of swelling to an enlarged cross-sectional shape in response to being heated and containing a thermoplastic melt adhesive is embedded between said cable strands of said cable bundle, and a radially pre-stretched heat-shrinkable hose member is mounted on the outer periphery of the cable bundle at said location to be sealed, whereupon said cable bundle location to be sealed is subjected to a heat treatment for causing said embedded plastic element to swell and said thermoplastic melt adhesive to be activated, and for re-shrinking said shrinkable hose member tightly about said cable bundle, said plastic element being employed in the form of an elongate composite adhesive strip composed of a first layer of a kneadable mass having good adhesive properties at ambient temperatures, and a second layer containing said melt adhesive, and said cable strands of said cable bundle are correctly positioned for further processing by adhesively securing them side by side to said first layer prior to said heat treatment being carried out, where said cable bundle at the location to be sealed is spread out to the form of a layer of juxtaposed cable strands, and at least one of the surfaces of said cable strand layer is adhesively secured to said first layer of said composite adhesive strip.

3. A method according to claim 2, where said cable strand layer adhesively secured to said composite adhesive strip is spirally wound upon itself prior to mounting said heat-shrinkable hose member on said location to be sealed.

4. A method according to claim 3, characterized in that said spirally winding operation is carried out in such a manner that said composite adhesive strip extends at an inner and said cable strands extend at an outer position.

5. A method according to claim 2, characterized in that said cable strand layer adhesively secured to said composite adhesive strip is pushed together to a zig-zag configuration prior to said heat-shrinkable hose being mounted on said location to be sealed.

6. A method according to any of claims 1 to 5, wherein the first layer of said strip consists of a rubber material.

7. A method according to claim 6 wherein the first layer of said strip consists of butyl rubber.

8. A method according to claim 6 wherein the second layer of said strip substantially consists of a melt adhesive material adapted in response to being heated to foam to thereby form a closed cell structure.

9. A method according to claim 7 wherein the second layer of said strip substantially consists of a melt adhesive material adapted in response to being heated to foam to thereby form a closed cell structure.

10. A method according to any of claims 1 to 5 wherein the second layer of said strip substantially consists of a melt adhesive adapted in response to being heated to foam to thereby form a closed cell structure.

11. A method according to any of claims 1 to 5, characterized in that said composite adhesive strip is cut to length from a supply reel.

12. A method according to any of claims 1 to 5, characterized in that it employs a composite adhesive strip the first layer of which is disposed between said second layer and a release paper layer.

13. An assembly kit for making an assembly for sealing a cable bundle comprising a plurality of cable strands in a longitudinally watertight manner, comprising a heat-shrinkable hose member adapted to shrink back to a reduced diameter in response to being heated, and a plastic element of a material capable of swelling up to an enlarged cross-section in response to being heated, containing, a thermoplastic melt adhesive, said heat-shrinkable hose member and said plastic element being adaptably defining a space for the accommodation of said cable strands therebetween, said plastic element being formed as a composite adhesive strip 1 comprising a first layer (1) of a kneadable mass having good adhesive properties at ambient temperature, and a second layer made of said melt adhesive.

14. An assembly kit according to claim 13, where said first layer of said composite adhesive strip consists of a rubber material.

15. An assembly kit according to claim 14, where said second layer of said composite adhesive strip consists of a melt adhesive adapted to foam in response to being heated to thereby form a closed cell structure.

16. An assembly kit according to any of claim 13 to 15, where said first layer of said composite adhesive strip is disposed between said second layer and a release paper layer.

17. An assembly kit according to claim 16, where said release paper layer consists of silicone paper.

18. An assembly kit according to claim 16, where said release paper layer is of a greater width than said first layer, and that said second layer is of a greater width than said first layer and said release paper layer.

19. An assembly kit according to any of claims 13 to 15, where said heat-shrinkable hose member is provided with an internal melt adhesive layer.

* * * * *